United States Patent [19]

Wunder

[11] 4,345,067

[45] Aug. 17, 1982

[54] EMULSION POLYMER RECOVERY

[75] Inventor: Richard H. Wunder, Corunna, Canada

[73] Assignee: Polysar Limited, Sarnia, Canada

[21] Appl. No.: 197,627

[22] Filed: Oct. 16, 1980

[30] Foreign Application Priority Data

Nov. 26, 1979 [CA] Canada .................................. 340590

[51] Int. Cl.[3] ................................................ C08C 1/15

[52] U.S. Cl. .................................... 528/485; 528/487; 528/488; 528/489; 528/492; 528/494

[58] Field of Search ............... 528/480, 485, 487, 488, 528/492, 491, 494

[56] References Cited

U.S. PATENT DOCUMENTS

| | | | |
|---|---|---|---|
| 2,529,885 | 11/1950 | Sears | 528/487 |
| 2,604,467 | 7/1953 | Crouch | 528/487 X |
| 2,709,689 | 5/1955 | Herzog | 260/8 |
| 2,788,336 | 4/1957 | Uhing | 260/8 |
| 3,015,854 | 1/1962 | McClure | 260/8 |
| 3,483,174 | 12/1969 | Libengood | 528/487 X |
| 3,501,423 | 3/1970 | Tate | 260/8 |
| 3,915,909 | 10/1975 | Schnöring | 528/487 X |

*Primary Examiner*—C. A. Henderson
*Attorney, Agent, or Firm*—Stevens, Davis, Miller & Mosher

[57] ABSTRACT

A process is provided for the coagulation of rubber polymers from aqueous emulsions thereof wherein the coagulation is undertaken in the presence of an additive selected from a polysaccharide material and from a vegetable derived proteinaceous material. The polymers so coagulated are readily dried and may be used for the manufacture of products well known for the specific polymers.

14 Claims, No Drawings

EMULSION POLYMER RECOVERY

This invention is directed to a novel process for the coagulation of synthetic polymers from emulsions in water whereby the coagulated rubber may be readily recovered and dried.

BACKGROUND OF THE INVENTION

Synthetic polymers prepared by polymerization of monomers in aqueous emulsion may be recovered as the solid product, dried and used as such. In has long been known that synthetic polymers prepared by free radical emulsion polymerization may be recovered as the solid product by coagulation by contact with an inorganic salt or an inorganic salt plus an acid, followed by separation of the coagulated polymer from the aqueous phase and subsequent drying of the separated polymer. Commonly used coagulation materials include as examples of the inorganic salts, sodium chloride, calcium chloride, magnesium sulphate, alum, etc., and as examples of inorganic salt plus acid, sodium chloride plus sulphuric hydrochloric or acetic acid. Using such materials leads to problems with disposal of the separated aqueous phase due to the presence therein of the various inorganic components. An alternative system of coagulation uses an acid, especially inorganic acids such as sulphuric or hydrochloric acid, and animal-derived glue as an additive—however, the coagulation efficiency is very variable with this system as evidenced by the presence of a relatively large amount of small particles in the separated aqueous phase, and the coagulated polymer frequently takes the form of very small-sized particles which are difficult to separate completely from the aqueous phase and which are difficult to dry to low residual moisture levels. A further alternative system of coagulation has been to use an inorganic acid, especially sulphuric or hydrochloric acid, and lignin as an additive—due to the dark color associated with lignin, this system is not suitable for use where normal light-colored polymers are required. Another system of coagulation is the addition of fairly large amounts of starch xanthate or pregelatinized cereal grain polysaccharide material to the polymer emulsion and co-precipitation of the polymer and additive by the addition of zinc chloride or sulphate or other mineral acid salts of divalent metals—the product from this system contains a fairly high proportion of non-polymer constituents which is not desirable nor commercially acceptable for all polymers. Reinforced polymers have been prepared by coagulation by contact with inorganic acid and alkali earth metal salts, of polymer emulsions in the presence of starch xanthate or cereal flour xanthate, which xanthates have previously been treated with resorcinol and formaldehyde—these polymers contain at least 30 parts by weight of the treated starch or cereal flour xanthate per 100 parts by weight of the polymer.

SUMMARY OF THE INVENTION

I have now discovered an improved process for the coagulation of rubbery polymers prepared by aqueous emulsion free radical polymerization, the process being characterized by the emulsion of said polymer being coagulated by mixing with aqueous inorganic coagulant and with an aqueous solution or suspension of an additive selected from a polysaccharide material and from a vegetable derived proteinaceous material and optionally with a water soluble polyamine compound.

According to one embodiment of my invention, there is provided an improved process for the coagulation of synthetic rubbery $C_4$–$C_6$ conjugated diolefin containing polymers prepared by aqueous emulsion free radical polymerization, the process being characterized in that the emulsion of said polymer is coagulated by mixing with aqueous inorganic coagulant and with an aqueous solution or suspension of an additive selected from a polysaccharide material and from a vegetable derived proteinaceous material and optionally with a water soluble polyamine compound, the amount of said additive being from about 0.5 to about 2.5 parts by weight per 100 parts by weight of polymer and the amount of said polyamine compound being from 0 to about 0.2 parts by weight per 100 parts by weight of polymer.

According to a further embodiment of my invention, there is provided an improved process for the coagulation of synthetic rubbery $C_4$–$C_6$ conjugated diolefin containing polymers prepared by aqueous emulsion free radical polymerization, the process being characterized in that the emulsion of said polymer is coagulated by mixing with aqueous inorganic coagulant and with an aqueous solution or suspension of a vegetable derived proteinaceous material additive and optionally with a water soluble polyamine compound, the amount of said additive being from about 0.5 to about 2 parts by weight per 100 parts by weight of said polymer and the amount of said polyamine compound being from 0 to about 0.1 parts by weight per 100 parts by weight of polymer, the coagulation being at a pH of below about 4.5.

According to a still further embodiment of my invention, there is provided an improved process for the coagulation of synthetic rubbery $C_4$–$C_6$ conjugated diolefin containing polymers prepared by aqueous emulsion free radical polymerization, the process being characterized in the emulsion of said polymer is coagulated by mixing with aqueous inorganic coagulant and with an aqueous suspension of a polysaccharide material additive and optionally with a water soluble polyamine compound, the amount of said additive being from about 1 to about 2.5 parts by weight per 100 parts by weight of polymer and the amount of said polyamine compound being from about 0.02 to about 0.1 parts by weight per 100 parts by weight of polymer.

Polymers which may be coagulated by my process are $C_4$–$C_6$ conjugated diolefin containing polymers including polymers containing one or more $C_4$–$C_6$ conjugated diolefins and polymers containing a $C_4$–$C_6$ conjugated diolefin and one or more other copolymerizable unsaturated hydrocarbyl monomers. Copolymerizable unsaturated hydrocarbyl monomers include the vinyl or vinylidene substituted aromatic hydrocarbons, such as styrene, alphamethyl styrene, vinyl toluene, divinyl benzene and the like, the vinyl or vinylidene nitrile compounds, such as acrylonitrile, methacrylonitrile and the like, and include the unsaturated organic acids, aldehydes, epoxide or amines. Suitable polymers, which are generally well known in the art, include polybutadiene, polyisoprene, butadiene-styrene polymers, isoprene-styrene polymers, butadiene-acrylonitrile polymers, isoprene-acrylonitrile polymers, butadiene-methacrylonitrile polymers, butadiene-alphamethyl styrene polymers, and polymers containing three or more monomers such as butadiene-styrene-divinyl benzene polymers, butadiene-acrylonitrile-divinyl benzene polymers and polymers of butadiene, styrene or acrylonitrile, and one or more of the unsaturated aldehydes, unsaturated organic acids, unsaturated epoxides or unsaturated organic amines. The polymers are prepared by the well-known hot or cold aqueous emulsion free radical polymerization techniques wherein the monomers are emulsified in water and fed to temperature controlled reactors together with the necessary electrolytes, initiators, catalyst, molecular weight control agents, the polymerization being permitted to proceed to the level of conversion normal for that system. Such polymerization techniques are described in numerous texts on the subject such as Rubber Technology, Editor M. Morton, Van Nostrand Reinhold Co., N.Y. and Synthetic Rubber, Editor-in-Chief G. S. Whitby, John Wiley and Sons, Inc., N.Y. The product from the polymerization reactors is subjected to the well known degassing and stripping steps for the removal of unreacted monomers and/or impurities before coagulation.

The coagulation of the emulsion of the polymer may be undertaken in a conventional coagulation vessel which may comprise an enclosed tank equipped with an agitator, temperature control system, inlet means and overflow outlet means. The aqueous emulsion of the polymer, the aqueous solution or suspension of the additive and the aqueous coagulant are added at appropriate rates to the coagulation vessel and mixed therein, the contents of the coagulation vessel being maintained at the desired temperature and under the desired level of agitation. The coagulated rubber and the supernatant liquid are removed, usually as an overflow stream, from the coagulation vessel.

The aqueous coagulant that I use is an aqueous solution of any of the inorganic salts, or inorganic salts plus an acid conventionally used for coagulation. Suitable inorganic salts include alum, the alkali metal salts such as sodium or potassium chloride and the alkaline earth metal salts such as calcium chloride or magnesium sulphate. Suitable acids include especially the mineral acids such as sulphuric or hydrochloric acid. The exact nature of the coagulant that I use depends on the nature of the polymer, as is well known in the art. For example, if the polymer were a butadiene-styrene or butadiene-styrene-divinyl benzene polymer, I prefer to use sodium chloride and sulphuric acid or sulphuric acid alone. If the polymer were a butadiene-acrylonitrile or a butadiene-acrylonitrile-divinyl benzene copolymer, I prefer to use calcium chloride or calcium chloride and sulphuric acid or sulphuric acid.

The coagulation conditions are essentially those normally used in the synthetic polymer industry for these types of polymers. Typical coagulation temperatures are from about 50° C. to about 90° C., preferably from about 60° C. to about 80° C. The pH of the aqueous phase in the coagulation vessel is generally maintained, when acid is present, at below about pH 4.5, preferably below about pH 4.2, and generally not below about pH 3.0, preferably not below about pH 3.5.

The coagulated polymer may be separated from the aqueous phase by conventional means such as vibrating screens, filters, etc. and may be subjected to one or more water wash steps and may be dried by passage through a dewatering-drying extruder system or a circulating hot air system and is then baled and packaged.

The polysaccharide material that I add, together with the emulsion of the polymer and the aqueous coagulant, to the coagulation vessel may be suitably selected from a cereal grain flour and from starch. Typical cereal grain flour include rye and wheat flour and typical starches include ungelatinized corn starch and ungelatinized starch derived from tuberous plants. The polysaccharide material does not dissolve in water but will readily form a suspension in water. Such suspensions in water are readily prepared by mixing the flour or starch with water and heating the mixture, preferably to a temperature not above the boiling point. The concentration of the polysaccharide material in water is not critical but will preferably be from about 2.5 to about 10 weight percent in the suspension. The quantity of polysaccharide material that I add to the coagulation mixture is preferably such that there will be from about 1 to about 2.5 parts by weight per 100 parts by weight of polymer.

The vegetable derived proteinaceous material that I add, together with the emulsion of the polymer and the aqueous coagulant, to the coagulation vessel may suitably be selected from the flour or concentrate obtained from the treatment of the vegetable, especially the oil bearing seeds, to extract the oil. Due to the chemical complexity of proteins, it is not possible to ascribe a definite chemical constitution of the vegetable derived proteinaceous material except that it will comprise a complex mixture of the various amino acids which, as a group, are know as proteins and other carbohydrate-type materials. Typical vegetable derived proteinaceous materials include the flours or concentrates derived from cotton seed, linseed, soyabean, sesame seed, castor seed, rapeseed, sunflower seed, safflower seed and peanuts. Such flours and concentrates are well known, per se. Preferred among these vegetable derived proteinaceous materials are the flours obtained from linseed, sunflower seed, castor seed, soyabean and peanuts. The vegetable derived proteinaceous materials are generally not directly soluble in water but can readily be formed into suspensions in water by mixing with water and heating the mixture, preferably to a temperature not above the boiling point. They may also be solubilized in water by mixing with sufficient of a water soluble alkali material. Suitable alkali materials may include sodium or potassium hydroxide, ammonium hydroxide, borax, sodium carbonate or organic amine compounds such as ethanolamine. Preferred among the alkali material is ammonium hydroxide. When an alkali material is used to solubilize the vegetable derived proteinaceous material it is preferred that the pH of the mixture be from about 9 to about 12, most preferaly from about 10 to about 11. The concentration of the vegetable derived proteinaceous material in water is not critical but will preferably be from about 2.5 to about 20, most preferably from about 3 to about 10, weight percent. The amount of vegetable derived proteinaceous material that I add to the coagulation mixture is preferably such that there will be from about 0.5 to about 2 parts by weight per 100 parts by weight of polymer.

The flow rates of the components to the coagulation vessel may be readily calculated once the polymer content of the polymer emulsion is known. The necessary amount of the additive solution or suspension can be readily calculated.

I have found that it may be desirable to also add to the coagulation vessel together with the emulsion of the polymer, the coagulant and the additive a small amount of a polyamine compound to improve the coagulation and reduce to a low level the amount of fines left in the aqueous phase. Suitable such polyamine compounds include acrylamide-acrylic acid salt copolymers and a variety of polyamines having a molecular weight in excess of 100 such as those produced by the reaction of an amine and an alkylene dihalide. These polyamine compounds are well known in the art, as exemplified in Canadian Pat. No. 979,595. The quantity of polyamine compound that I may add is in the range of from 0 to about 0.2, especially from 0 to about 0.1 and even from 0 to about 0.05 and more preferably from about 0.02 to about 0.1, parts by weight per 100 parts by weight of polymer.

I have found that the coagulated polymer from my process is generally a porou material with a low level of tack which is easily washed and which dries rapidly. The dry polymer may be used in all the end products well known for that type of polymer such as, depending on the particular type of polymer, tires, belts, hoses, shoe soles, etc.

DESCRIPTION OF PREFERRED EMBODIMENTS

In the following examples, all parts are parts by weight unless otherwise specified.

EXAMPLE 1

A 12 l glass flat bottom high wall container was filled with about 8 l of water. An agitator was mounted over the container so that the aqueous phase could be mixed. A probe of a pH meter was mounted over the container so that the probe could continuously measure the pH of the aqueous phase. A line lead into the water so that steam could be supplied to the water and a thermocouple was mounted so that the temperature of the aqueous phase could be measured. A supply means was provided so that small quantities of a polyamine compound could be added to the aqueous phase. The water in the container was adjusted to a temperature of about 50° C. and the pH was adjusted to between 3.5 and 4.0 by the addition of dilute sulphuric acid. An SBR latex was added to the aqueous phase while maintaining the pH at 3.5–4 by simultaneous addition of sulphuric acid and the polyamine compound (NALCO® 107) was simultaneously added continuously at a rate such that 0.1 parts by weight of polyamine compound was added per 100 parts by weight of polymer. The SBR was a polymer containing about 23.5 weight percent of styrene and about 76.5 weight percent of butadiene and the latex contained about 24 weight percent of the polymer. A total volume of about 1 l of latex was added to the aqueous phase and coagulated. After the addition of the latex the agitator was left running for about 2 minutes to ensure complete mixing of the components and then turned off. The aqueous phase (serum) was found to be fairly clear and the polymer, which rose to the surface of the aqueous phase, was in the form of medium to large particles which were tacky on the surface. The polymer particles were removed and dried in a forced hot air drier to yield particles of large size which contained small pockets of water entrapped within some of the particles.

This example illustrates a coagulation process of the prior art.

EXAMPLE 2

The procedure and materials of Example 1 was used except that the 8 l of water contained about 2.5 weight percent of sodium chloride and the polyamine was added at a rate of such that about 0.05 parts by weight was added per 100 parts by weight of polymer. After the agitator was turned off, the serum was found to be clear and the polymer was in the form of large particles. On drying of the polymer particles, they tended to stick to one another and contained a number of small pockets of water entrapped within the particles.

This example illustrates a coagulation process of the prior art.

EXAMPLE 3

The procedure of Example 1 was used except that the polymer was a butadiene-acrylonitrile polymer containing about 34 weight percent of acrylonitrile, the emulsifier being of the fatty acid type, and the latex contained about 28 weight percent of polymer. After the agitator had been turned off, the serum was found to be slightly cloudy and the polymer was in the form of large particles which were tacky on the surface. Drying of the polymer particles yielded particles which were stuck together and contained small pockets of water trapped within the particles.

This example illustrates a coagulation process of the prior art.

EXAMPLE 4

Using the equipment described in Example 1, a butadiene-acrylonitrile polymer containing about 34 weight percent of acrylonitrile, the emulsifier being an alkali metal salt of an alkyl naphthalene sulphonic acid, and the latex containing about 30 weight percent of polymer, was coagulated by addition of about 1 l of the latex to about 8 l of water maintained at about 50° C. and containing about 0.3 weight percent of calcium chloride with the simultaneous addition of a solution containing about 0.5 weight percent of calcium chloride. After the agitator was turned off, the serum was fairly clear and the polymer was present as large particles. Drying of the polymer particles yielded polymer still containing small quantities of water within the large polymer particles.

This example illustrates a coagulation process of the prior art.

EXAMPLE 5

Following the procedure of Example 1, the SBR latex was coagulated by slow addition to the aqueous phase while sulphuric acid was also being added to maintain the pH at 3.5–4, polyamine compound was added at a rate such as to provide 0.1 parts by weight of polyamine compound per 100 parts by weight of polymer and a 2.5 weight percent suspension of corn starch, which had been previously boiled, was added at a rate such as to provide about 1.4 parts by weight of dry corn starch per 100 parts by weight of polymer.

After the agitator had been turned off, the serum was found to be fairly clean and the polymer was in the form of small particles with low surface tack. Drying of the polymer particles yielded particles of about the same size and which were uniformly low in water content.

Compared with Example 1, the process described in this Example yielded smaller and more uniformly sized particles which were easier to dry to a uniform low residual moisture level.

EXAMPLE 6

The procedure of Example 5 was followed, except that instead of the corn starch there was used a suspension (5 weight percent) of soya flour, which had been brought into suspension by boiling, at a rate such as to provide about 1.5 parts by weight of dry soya flour per 100 parts by weight of polymer and the rate of addition of polyamine compound was such as to provide about 0.03 parts by weight of polyamine compound per 100 parts by weight of polymer.

When the agitator was turned off the serum was clear and the polymer was present as fairly uniformly sized small particles having low surface tack. Drying of the polymer yielded particles of about the same size which were uniformly low in water content.

EXAMPLE 7

The procedure of Example 2 was followed except that the polyamine compound was added at a rate such as to provide about 0.02 parts be weight of polyamine compound per 100 parts by weight of polymer and there was also added a suspension (about 5 weight percent) of soya flour, which had been brought into suspension by boiling, at a rate such as to provide about 0.7 parts by weight of soya flour per 100 parts by weight of polymer.

After agitation was completed, the serum was clear and the polymer particles were small uniformly sized particles having low surface tack and which dried readily to yield similar size particles having a uniformly low residual water content.

EXAMPLE 8

The procedure of Example 1 was followed except that the rate of addition of polyamine compound was such as to provide about 0.02 parts by weight per 100 parts by weight of polymer and that there was also added a suspension of wheat flour, previously brought into suspension by boiling, a rate such as to provide 1.5 parts by weight of wheat flour per 100 parts by weight of polymer.

When the agitator was turned off, the serum was found to be fairly clear and the polymer was present as small particles having a low surface tack which were dried to yield similar size particles having a uniform low level of residual water content.

EXAMPLE 9

The procedure of Example 1 was used except that no polyamine compound was added and a solution containing about 5 weight percent of peanut flour was added. The peanut flour had been brought into solution by addition of aqueous ammonia until the pH of the peanut flour solution was about 10.5. The rate of addition of peanut flour solution was such as to provide about 1.8 parts by weight of peanut flour per 100 parts by weight of polymer.

The serum was found to be essentially clear and the polymer particles were fairly small with a fairly low surface tack. The polymer particles dried readily without much agglomeration of the particles and had no pockets of residual water.

EXAMPLE 10

The procedure of Example 1 was followed except that the polyamine compound was added at a rate to provide about 0.02 parts by weight of polyamine compound per 100 parts by weight of polymer and a solution of sunflower seed flour was added at a rate to provide about 2 parts by weight of sunflower seed flour per 100 parts by weight of polymer. The sunflower seed flour had been brought into solution in water by addition of aqueous ammonia until the pH was about 10.

The serum was clear and the polymer particles were small uniformly sized and had a low surface tack. On drying of the polymer particles the produce was a similar small size and was uniformly dry with no pockets of residual water.

EXAMPLE 11

Example 9 was repeated with the exception that, instead of adding peanut flour, soy protein concentrate dissolved in water by the addition of aqueous ammonia to a pH of about 10 was added at a rate of 1.3 parts by weight per 100 parts by weight of polymer.

The serum was slightly cloudy and the polymer particles were of uniform very small size with essentially no surface tack. The polymer particles dried readily to yield a uniformly dry product.

EXAMPLE 12

Following the procedure of Example 3 except that an ammonia solution (pH 10.5) of soya flour was also added a rate of 1.5 parts by weight per 100 parts by weight of polymer and the rate of polyamine compound addition was reduced to about 0.04 parts by weight per 100 parts by weight of polymer, the butadiene-acrylonitrile latex was coagulated and yielded small particles of polymer having little surface tack which dried readily to a uniform low residual water level. The serum was found, in comparison with the serum of Example 3, to have lower COD and BOD levels.

EXAMPLE 13

The butadiene-acrylonitrile latex of Example 4 was coagulated by the procedure described in Example 4 with the exceptions that the aqueous phase was maintained at a pH of 3.5 to 4 by the addition of sulphuric acid at the same time as the calcium chloride solution was being added and a solution of soya flour in aqueous ammonia was also added at a rate to provide 0.5 parts by weight of soya flour per 100 parts by weight of polymer. The serum from the coagulation was clear and the polymer particles were fairly small and relatively uniform in size and readily dried to a low residual moisture level.

Compounding and vulcanization of the recovered polymers from the examples showed that the vulcanizates from Examples 5 to 13 had essentially similar properties to those of the corresponding controls of Examples 1 to 4.

What is claimed is:

1. An improved process for the coagulation of a butadiene-styrene polymer prepared by aqueous emulsion free radical polymerization, the process being characterized in that the emulsion of said polymer is coagulated by mixing (i) with aqueous inorganic coagulant which is one of sulphuric acid or sulphuric acid plus sodium chloride, (ii) with an aqueous solution or suspension of an additive of polysaccharide material or a vegetable derived proteinaceous material and (iii) with a water soluble polyamine compound, the amount of said additive being from about 0.5 to about 2.5 parts by weight per 100 parts by weight of said polymer and the amount of said polyamine compound being from about 0.02 to about 0.2 parts by weight per 100 parts by weight of said polymer, the sulphuric acid being in sufficient quantity to maintain the pH during coagulation at below about 4.5.

2. An improved process for the coagulation of a butadiene-acrylonitrile polymer prepared by aqueous emulsion free radical polymerization, the process being characterized in that the emulsion of said polymer is coagulated by mixing (i) with aqueous inorganic coagulant which is sulphuric acid or sulphuric acid plus calcium chloride, (ii) with an aqueous solution or suspension of an additive of polysaccharide material or a vegetable derived proteinaceous material and (iii) with a water soluble polyamine compound, the amount of said additive being from about 0.5 to about 2.5 parts by weight per 100 parts by weight of said polymer and the amount of said polyamine compound being from about 0.02 to about 0,2 parts by weight per 100 parts by weight of said polymer, the sulphuric acid being in sufficient quantity to maintain the pH during coagulation at below about 4.5.

3. An improved process for the coagulation of a butadiene-styrene polymer prepared by aqueous emulsion free radical polymerization, the process being characterized in that the emulsion of said polymer is coagulated by mixing (i) with aqueous inorganic coagulant which is sulphuric acid or sulphuric acid plus sodium chloride, (ii) with an aqueous solution or suspension of a vegetable derived proteinaceous material additive which flour obtained from linseed, sunflower seed, castor seed, soyabean or peanut and (iii) with a water soluble polyamine compound, the amount of said additive being from about 0.5 to about 2 parts by weight per 100 parts by weight of said polymer and the amount of said polyamine compound being from about 0.02 to about 0.1 parts by weight per 100 parts by weight of said polymer, the coagulation being at a pH of below about 4.5.

4. An improved process for the coagulation of a butadiene-acrylonitrile polymer prepared by aqueous emulsion free radical polymerization, the process being characterized in that the emulsion of said polymer is coagulated by mixing (i) with aqueous inorganic coagulant which is sulphuric acid or sulphuric acid plus calcium chloride, (ii) with an aqueous solution or suspension of a vegetable derived proteinaceous material additive which is flour obtained from linseed, sunflower seed, castor seed, soyabean or peanut and (iii) with a water soluble polyamine compound, the amount of said additive being from about 0.5 to about 2 parts by weight of said polymer and the amount of said polyamine compound being from about 0.02 to about 0.1 parts by weight per 100 parts by weight of said polymer, the coagulation being at a pH of below about 4.5.

5. The process of claim 3 wherein the sulphuric acid is sufficient to maintain a pH of from about 3 to about 4, the polyamine compound is from about 0.02 to about 0.05 parts by weight per 100 parts by weight of polymer and the vegetable derived proteinaceous material is added at a rate to provide from about 0.5 to about 1.5 parts by weight per 100 parts by weight of polymer.

6. The process of claim 4 wherein the sulphuric acid is sufficient to maintain a pH of from about 3 to about 4, the polyamine compound is from about 0.02 to about 0.05 parts by weight per 100 parts by weight of polymer and the vegetable derived proteinaceous material is added at a rate to provide from about 0.5 to about 1.5 parts by weight per 100 parts by weight of polymer.

7. An improved process for the coagulation of a butadiene-styrene polymer prepared by emulsion free radical polymerization, the process being characterized in that the emulsion of said polymer is coagulated by mixing (i) with aqueous inorganic coagulant which is sulphuric acid or sulphuric acid plus sodium chloride, (ii) with an aqueous suspension of a polysaccharide material additive selected from the group consisting of cereal grain flour and starch and (iii) with a water doluble polyamine compound, the amount of said additive being from about 1 to about 2.5 parts by weight per 100 parts by weight of polymer, the amount of said polyamine compound being from about 0.02 to about 0.1 parts by weight of polymer, the amount of sulphuric acid being sufficient to maintain a pH of from about 3 to about 4.

8. The process of claim 7 wherein the polysaccharide material is a cereal grain flour.

9. The process of claim 7 wherein the polysaccharide material is starch.

10. An improved process for the coagulation of a butadiene-acrylonitrile polymer prepared by emulsion free radical polymerization, the process being characterized in that the emulsion of said polymer is coagulated by mixing (i) with aqueous inorganic coagulant which is sulphuric acid or sulphuric acid plus calcium chloride or alum, (ii) with an aqueous suspension of a polysaccharide material additive selected from the group consisting of cereal grain flour and starch and (iii) with a water soluble polyamine compound, the amount of said additive being from about 1 to about 2.5 parts by weight per 100 parts by weight of polymer, the amount of said polyamine compound being from about 0.02 to about 0.1 parts by weight per 100 parts by weight of polymer and the amount of sulphuric acid being sufficient to maintain a pH of from about 3 to about 4.

11. An improved process for the coagulation of a butadiene-acrylonitrile polymer prepared by emulsion free radical polymerization, the process being characterized in that the emulsion of said polymer is coagulated by mixing (i) with aqueous inorganic coagulant which is alum or calcium chloride, (ii) with an aqueous suspension of a polysaccharide material additive selected from the group consisting of cereal grain flour and starch and (iii) with a water soluble polyamine compound, the amount of said additive being from about 1 to about 2.5 parts by weight per 100 parts by weight of polymer, the amount of said polyamine compound being from about 0.02 to about 0.01 parts by weight per 100 parts by weight of polymer.

12. An improved process for the coagulation of a butadiene-acrylonitrile polymer prepared by aqueous emulsion free radical polymerization, the process being characterized in that the emulsion of said polymer is coagulated by mixing (i) with aqueous inorganic coagulant which is calcium chloride, (ii) with an aqueous solution or suspension of an additive of polysaccharide material or a vegetable derived proteinaceous material and (iii) with a water soluble polyamine compound, the amount of said additive being from about 0.5 to about 2.5 parts by weight per 100 parts by weight of said polymer and the amount of said polyamine compound being from about 0.02 to about 0.2 parts by weight per 100 parts by weight of said polymer.

13. The process of claim 10 or claim 11 wherein the polysaccharide material is a cereal grain flour.

14. The process of claim 10 or claim 11 wherein the polysaccharide material is starch.

* * * * *